US008767901B2

(12) United States Patent
Yang

(10) Patent No.: US 8,767,901 B2
(45) Date of Patent: Jul. 1, 2014

(54) REAL-TIME CLOCK FREQUENCY CORRECTION DEVICES

(71) Applicant: Coretex Technology Corporation, New Taipei (TW)

(72) Inventor: Chih-Hsin Yang, New Taipei (TW)

(73) Assignee: Cortex Technology Corporation, New Taipei (TW)

( * ) Notice: Subject to any disclaimer, the term of this patent is extended or adjusted under 35 U.S.C. 154(b) by 0 days.

(21) Appl. No.: 13/842,469

(22) Filed: Mar. 15, 2013

(65) Prior Publication Data

US 2014/0133615 A1 May 15, 2014

(30) Foreign Application Priority Data

Nov. 15, 2012 (TW) ............................. 101222108 A

(51) Int. Cl.
*H04L 7/00* (2006.01)

(52) U.S. Cl.
USPC .......................................................... 375/371

(58) Field of Classification Search
CPC ............ H01L 7/033; H01L 1/00; G04G 5/00; G04G 3/022; G06F 1/14
USPC .......................................................... 375/371
See application file for complete search history.

(56) References Cited

U.S. PATENT DOCUMENTS 6,304,517 B1 * 10/2001 Ledfelt et al. .................. 368/10
2008/0244301 A1 * 10/2008 Shih ............................. 713/500

* cited by examiner

*Primary Examiner* — Juan A Torres
(74) *Attorney, Agent, or Firm* — Muncy, Geissler, Olds & Lowe, P.C.

(57) ABSTRACT

A real-time clock frequency correction device includes: a quartz oscillator outputting an oscillating signal including a plurality of oscillating pulses with a frequency; a control unit setting a first integer, a second integer, a first number corresponding to the first integer, and a second number corresponding to the second integer according to the frequency, wherein the first integer is a minimum integer that is larger than the frequency, and the second integer is a maximum integer that is smaller than the frequency; a multiplexer outputting the first integer for the first number of times and the second integer for the second number times; and a counter, coupled to the multiplexer and the quartz oscillator, for counting the number of oscillating pulses according to one of the first integer and the second integer and thereby outputting a pulse.

6 Claims, 4 Drawing Sheets

REAL-TIME CLOCK FREQUENCY CORRECTION DEVICES

CROSS REFERENCE TO RELATED APPLICATIONS

This Application claims priority of Taiwan Patent Application No. 101222108, filed on Nov. 15, 2012, the entirety of which is incorporated by reference herein.

BACKGROUND OF THE INVENTION

1. Field of the Invention

The disclosure relates generally to devices for real-time frequency correction, and more particularly, relates to devices for correcting the real-time frequency by two adjacent integers.

2. Description of the Related Art

A real-time clock, which is a counter for counting years, days, hours, minutes, and seconds, includes a quartz oscillator, a second counter, a minute counter, an hour counter, a day counter, and a year counter. The output frequency of the quartz oscillator is usually assumed to be 32768 Hz.

The second counter counts the output pulses of the quartz oscillator. When the counting of the second counter reaches 32768, a notification signal is outputted to the minute counter. When the counting of the minute counter reaches 60, the minute counter outputs a notification signal to the hour counter. When the counting of the hour counter reaches 24, the hour counter outputs a notification signal to the day counter. When the counting of the day counter reaches a predefined value, the day counter outputs a notification signal to the year counter.

The accuracy of the real-time clock is thus dependent on the frequency generated by the quartz oscillator. However, the frequency generated by the quartz oscillator is susceptible to the effects of the ambient temperature or the manufacturing process, thus resulting in frequency drift. There is usually a −20 ppm and 20 ppm variation rate in the frequency generated by the quartz oscillator. If the frequency generated by the quartz oscillator is not accurate, it results in the inaccuracy of the time counted by the real-time clock. Even though there are many different correction mechanisms to improve the accuracy of the real-time clock, the correction mechanisms are not intuitive and simple.

BRIEF SUMMARY OF THE INVENTION

A detailed description is given in the following embodiments with reference to the accompanying drawings.

This invention provides a real-time clock frequency correction device including: a quartz oscillator outputting an oscillating signal including a plurality of oscillating pulses with a frequency; a control unit setting a first integer, a second integer, a first number corresponding to the first integer, and a second number corresponding to the second integer according to the frequency, wherein the first integer is a minimum integer that is larger than the frequency, and the second integer is a maximum integer that is smaller than the frequency; a multiplexer outputting the first integer for the first number of times and outputting the second integer for the second number of times; and a counter, coupled to the multiplexer and the quartz oscillator, for counting the number of oscillating pulses according to one of the first integer and the second integer and thereby outputting a pulse.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
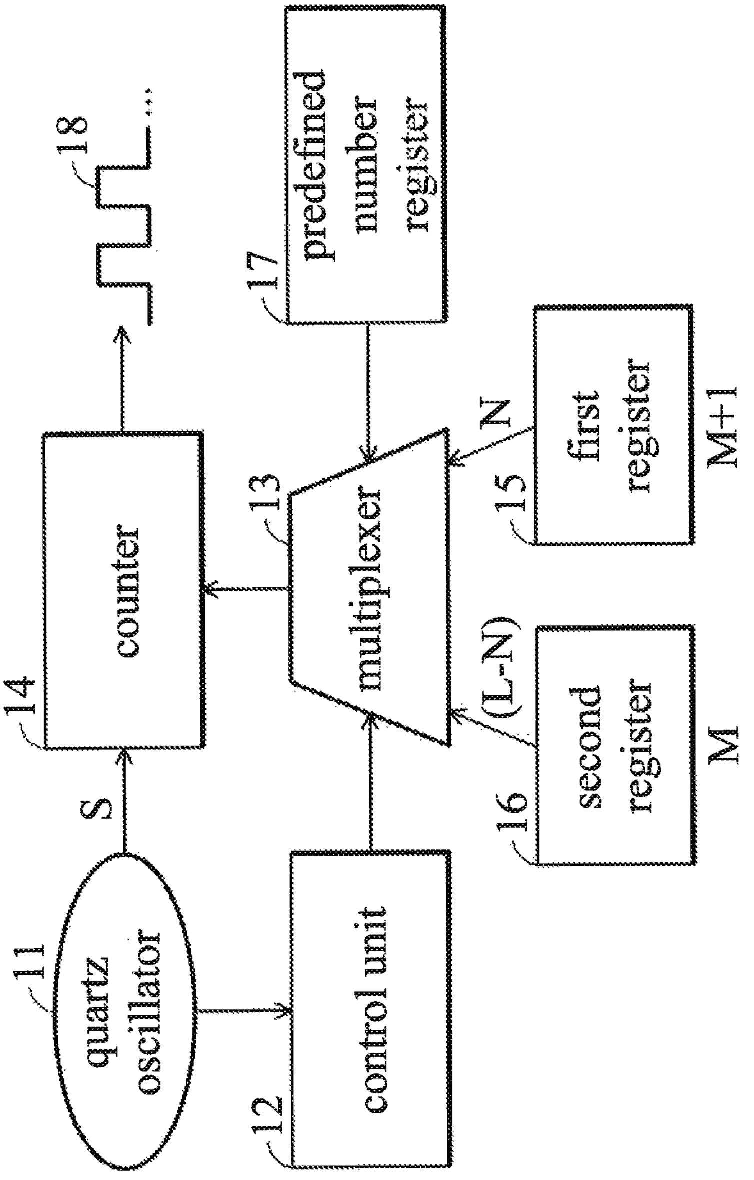
FIG. 1 is a block diagram of a real-time clock frequency correction device according to an embodiment of the invention.
Figure 2:
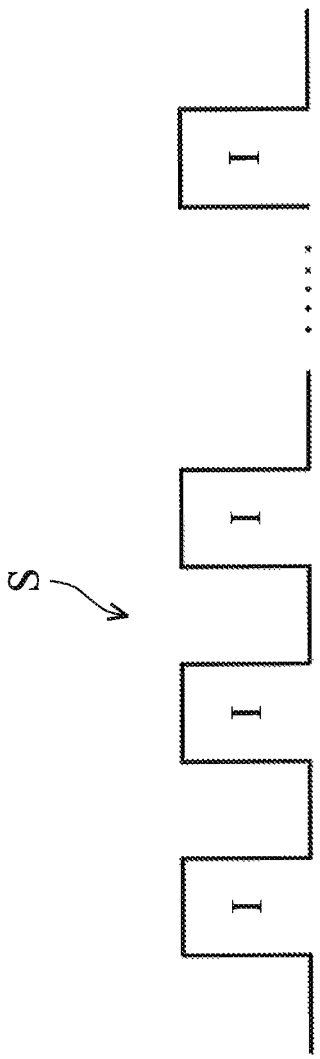
FIG. 2 is a waveform chart of the oscillating signal S according to an embodiment of the invention

FIG. 1 is a block diagram of a real-time clock frequency correction device according to an embodiment of the invention. According to an embodiment of the invention, the real-time clock frequency correction device includes a quartz oscillator 11, a control unit 12, a multiplexer 13, a counter 14, a first register 15, a second register 16, and a predefined number register 17. The quartz oscillator 11 outputs an oscillating signal S, which includes a plurality of oscillating pulses with a frequency. FIG. 2 is a waveform chart of the oscillating signal S according to an embodiment of the invention. As shown in FIG. 2, the oscillating signal S includes a plurality of oscillating pulses I. According to an embodiment of the invention, the frequency of the oscillating signal S can be 32768 Hz or a frequency around 32768 Hz. Moreover, the frequency of the oscillating signal S outputted from the quartz oscillator 11 is susceptible to the effect of ambient temperature, thus resulting in frequency drift, such as drifting from 32768 Hz to 32766 Hz.

After the control unit 12 obtains the frequency of the quartz oscillator 11, the frequency of the oscillating signal is divided into an integer part and a decimal part. According to an embodiment of the invention, the frequency of the oscillating signal S is determined by a lookup table or a polynomial equation according to a temperature.

The control unit 12 sets a first integer, a second integer, a first number corresponding to the first integer, and a second number corresponding to the second integer according to the frequency of the oscillating signal S. The control unit 12 sets the first integer as the minimum integer that is larger than the frequency of the oscillating signal S and stores the first integer in the first register 15. The control unit 12 also sets the second integer as the maximum integer that is smaller than the frequency of the oscillating signal S. That is, the integer part of the frequency of the oscillating signal S is set as the second integer, and the second integer is stored in the second register 16. Specifically, the first integer is larger than the second integer by one.

The control unit 12 obtains a product of the predefined number and the decimal part of the frequency of the oscillating signal S. The control unit 12 further sets the first number according to the integer part of the product and sets the second number according to the difference of the predefined number and the first integer. The first number is thus the number of times that the first integer will be loaded into the counter 14. Similarly, the second number is the number of times that the second integer will be loaded into the counter 14. The sum of the first number and the second number is the predefined number stored in the predefined number register 17.

The control unit 12 controls the multiplexer 13 to output the first integer for the first number of times and output the second integer for the second number of times to the counter 14. The counter 14, which is coupled to the multiplexer 13 and the quartz oscillator 11, counts the number of the oscillating pulses I according to one of the first integer and the second integer and thereby outputting the pulse 18.

Figure 3:
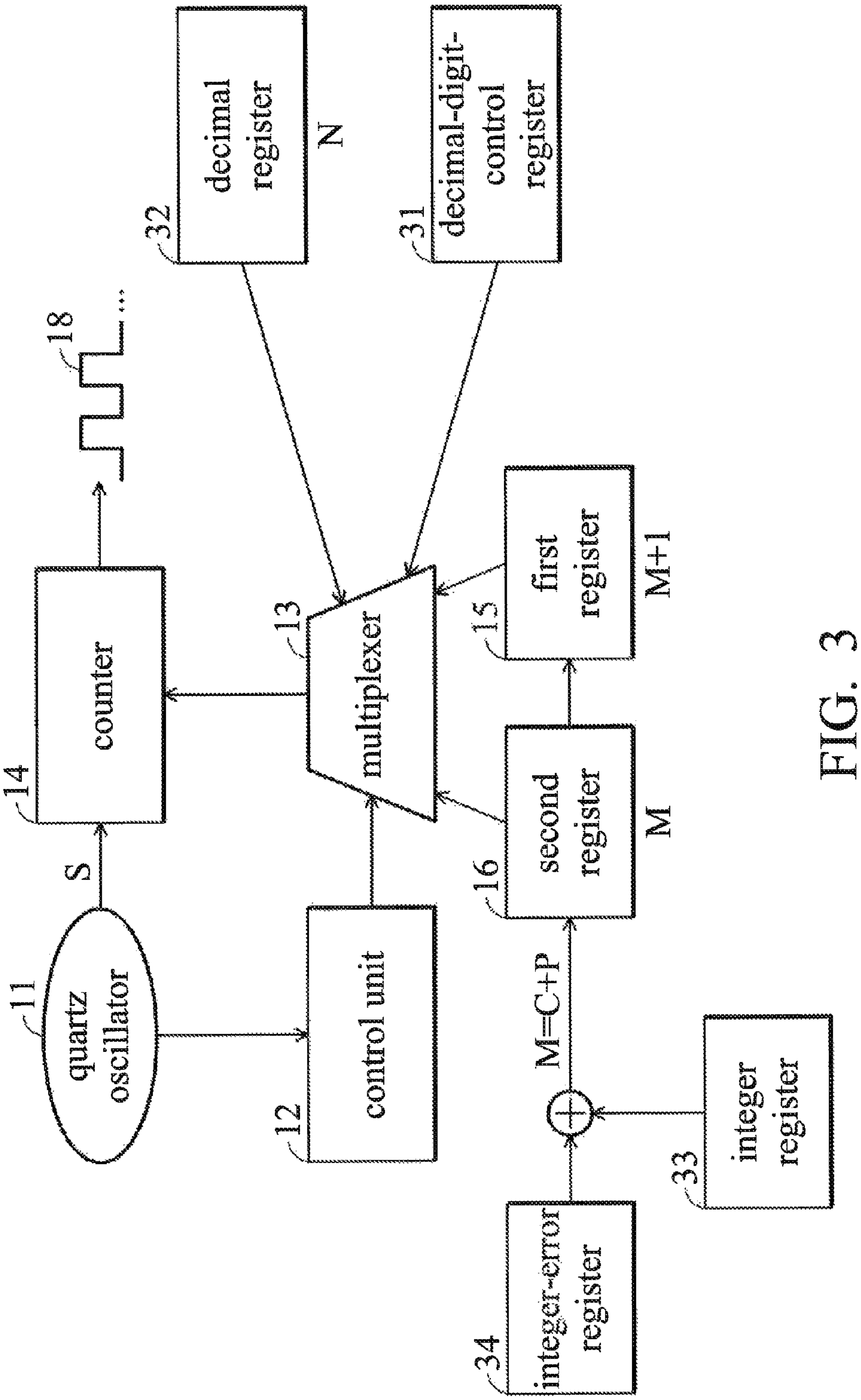
FIG. 3 is a block diagram of a general real-time clock frequency correction device according to another embodiment of the invention.

For example, assuming that the frequency of the quartz oscillator 11 is 32767.46 Hz, in which the integer part of the frequency is 32767. The second integer is thus 32767, and the first integer is 32768. The decimal part of the frequency is 0.46, which determines the number of times that the first integer and the second integer will be loaded into counter 14 (that is, the first number and the second number). Assuming that the predefined number is 10, and thus the product of the decimal part of the frequency and predefined number is 4.6 (0.46×10=4.6). The integer part, 4, is the first number, and the second number, which is corresponding to the number of times that the second integer will be loaded into the counter 14, is therefore 6 (10−4=6). FIG. 3 is a block diagram of a general real-time clock frequency correction device according to another embodiment of the invention. According to another embodiment of the invention, in addition to the units shown in FIG. 1, the general real-time clock frequency correction device of FIG. 3 further includes a decimal-digit-control register 31, a decimal register 32, an integer register 33, and an integer-error register 34, where a decimal-digit n is stored in the decimal-digit-control register 31. According to an embodiment of the invention, for example, the decimal-digit is in binary form, and the decimal-digit n stored in the decimal-digit-control register 31 is set to 8. That is, the predefined number is eighth-powers of two, i.e. 256. The product of the predefined number and the decimal part of the frequency of the oscillating signal S is derived thereby. The integer part of the product is stored in the decimal register 32 as the first number N.

The integer register 33 stores a predefined value C, and the integer-error register 34 stores a difference P between the integer part of the frequency of the oscillating signal S and the predefined value C. According to an embodiment of the invention, for example, the frequency of the output of the quartz oscillator 11 is 32768 Hz, normally, and the predefined value C is therefore set to 32768. However, the actual frequency of oscillating signal S is 32766.46 Hz, such that the difference P is 32766−32768=−2, where the plus sign or minus sign can be represented by two's complement.

The operation of the real-time clock frequency correction device according to an embodiment of the invention is described by the following example. For example, the control unit 12 obtains the frequency of the oscillating signal S of the quartz oscillator 11 as 32767.46 Hz and then divides 32767.46 into an integer part and a decimal part. Because the predefined value stored in the integer register 33 is 32768, the difference P stored in the integer-error register 34 should be −1. Therefore, the second integer M stored in the second register 16 is 32767, and the first integer (M+1) stored in the first register 15 is 32768.

Figure 4:
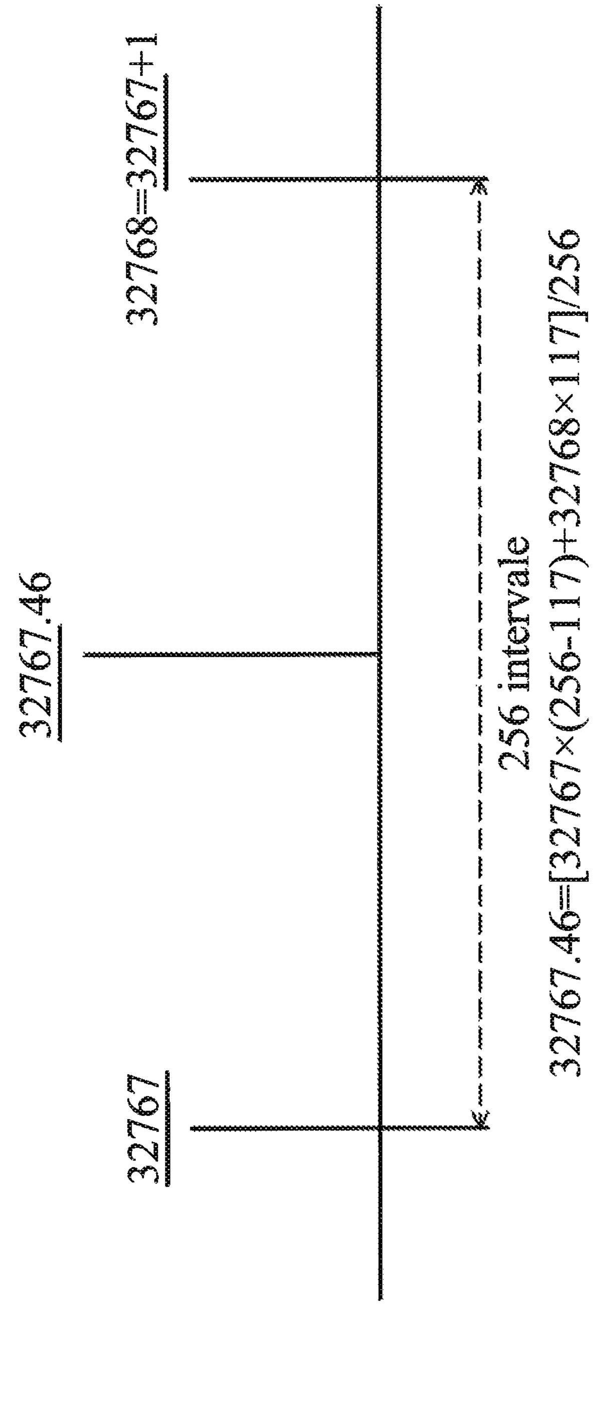
FIG. 4 is a diagram illustrating the relationship among the predefined number, the first number, and the second number according to an embodiment of the invention.

Moreover, the decimal-digit n stored in the decimal-digit-control register 31 is 8 and is represented in binary form. That is, the predefined number is 256. FIG. 4 is a diagram illustrating the relationship among the predefined number, the first number, and the second number according to an embodiment of the invention. There are 256 intervals interposed between two consecutive integers around the frequency (that is, 32767 and 32768). The product of the predefined number and the decimal part of the frequency of the oscillating signal S is 0.46*256=117.76. The integer part, 117, is set as the first number N representing the number of times that the first integer (M+1) will be loaded into the counter 14. The difference of the predefined number and the first number N is 139, which will be stored in the second register 16 as the second number representing the number of times that the second integer M will be loaded into the counter 14. The frequency of the oscillating signal S may be represented by the following equation:

$$32767.46 \cong [32767\times(256-117)+32768\times117]/256 \quad (1)$$

Therefore, the time accumulated for counting 256 times by the counter 14 is:

$$[32767.46/32767\times(256-117)+32767.46/32768\times117] = 256.0000233 \quad (2)$$

By using of a constant divisor (32768), the time accumulated for counting 256 times is:

$$32767.463/32768\times256=255.9957813 \quad (3)$$

The embodiments of the inventive real-time clock frequency correction device, which are disclosed in this invention, generate an accurate frequency of a real-time clock in a simple and intuitive way. Referring to the results of equation 2 and equation 3, the frequency can be precisely corrected after the frequency correction method of the real-time clock frequency correction device according to the invention is implemented.

In the context of the present disclosure, a "computer-readable medium" can be any medium that can contain, store, or maintain the logic or application described herein for use by or in connection with the instruction execution system. The computer-readable medium can include any one of many physical media such as, for example, magnetic, optical, or semiconductor media. Specific examples of a suitable computer-readable medium would include, but are not limited to, magnetic tapes, magnetic floppy diskettes, magnetic hard drives, memory cards, solid-state drives, USB flash drives, or optical discs.

Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A real-time clock frequency correction device comprises:

a quartz oscillator outputting an oscillating signal comprising a plurality of oscillating pulses with a frequency;

a control unit, setting a first integer, a second integer, a first number corresponding to the first integer, and a second number corresponding to the second integer according to the frequency, wherein the first integer is a minimum integer that is larger than the frequency, and the second integer is a maximum integer that is smaller than the frequency;

a multiplexer, outputting the first integer for the first number of times and outputting the second integer for the second number of times; and a counter, coupled to the multiplexer and the quartz oscillator, for counting a number of oscillating pulses according to one of the first integer and the second integers and thereby outputting a pulse.

2. The real-time clock frequency correction device of claim 1, wherein the frequency of the oscillating signal is determined by a lookup table or a polynomial equation according to a temperature.

3. The real-time clock frequency correction device of claim 1, further comprising a first register storing a predefined number.

4. The real-time clock frequency correction device of claim 3, wherein the frequency of the oscillating signal comprises a first integer part and a first decimal part, and wherein the control unit sets the first number according to a second integer part of a product of the predefined number and the first decimal part, and sets the second number according to a difference between the predefined number and the first number.

5. The real-time clock frequency correction device of claim 4, further comprising:

a decimal-digit-control register, storing a decimal-digit; and a decimal register, storing the second integer part, wherein if the decimal-digit is in binary form, the predefined number is two to the power of the decimal-digit.

6. The real-time clock frequency correction device of claim 4, further comprising:

an integer register, storing a third integer, which is a predefined value of the frequency; and an integer-error register, storing a value subtracting the third integer from the first integer part.

* * * * *